Figure 1:
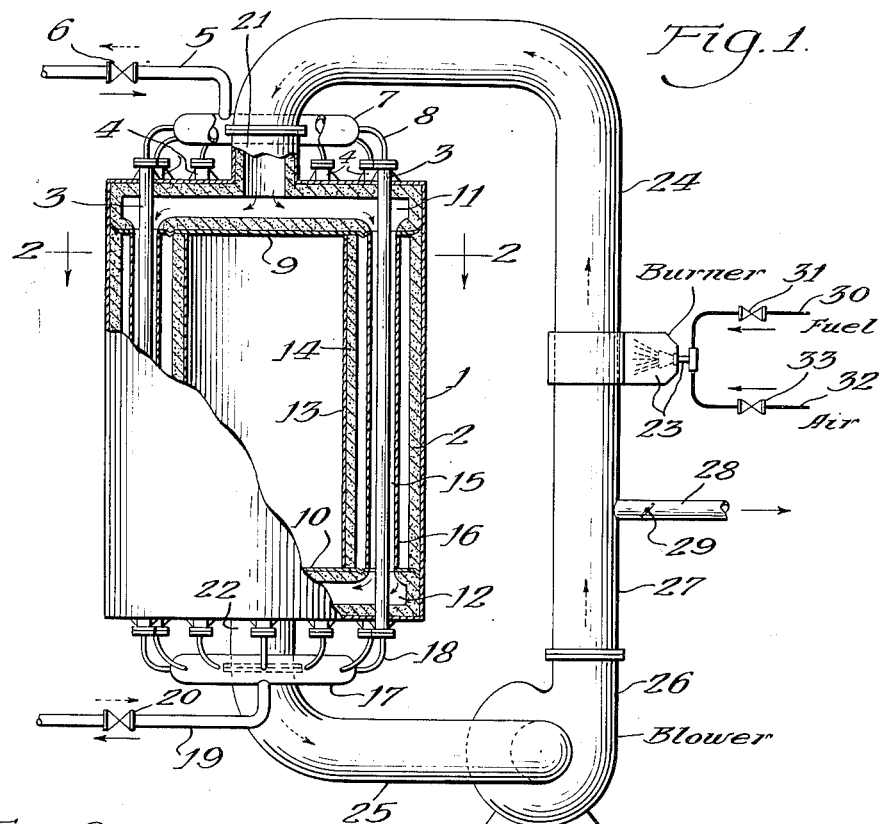

Dec. 23, 1952     H. A. BECKER     2,622,853
HEATING APPARATUS
Filed Nov. 3, 1948

INVENTOR.
Harold A. Becker
BY M. P. Venema
    Attorney
Philip J. Liggett
    Agent

UNITED STATES PATENT OFFICE 2,622,853

HEATING APPARATUS

Harold A. Becker, La Grange, Ill., assignor to Universal Oil Products Company, Chicago, Ill., a corporation of Delaware Application November 3, 1948, Serial No. 58,091

1 Claim. (Cl. 257—228)

This invention relates to an improved means for heating fluid streams and more particularly to a heating apparatus or reactor which provides uniform heating for a plurality of tubes or conduits conducting a fluid medium undergoing conversion.

The present improved heating apparatus is such that either a liquid or gaseous heating medium may be passed through the unit and provide substantially uniform heating, or cooling, for a fluid being passed through a plurality of tubular conduits. Many industrial processes, including those devoted to the catalytic conversion of hydrocarbons, for example, employ combustion gases as a convective medium for controlling the temperature of the reaction. To accomplish this it is a common practice to provide a reactor or heat exchange apparatus, of the shell and tube type and to pass the reactant in a plurality of smaller streams through the tubular elements, with hot combustion gases employed as the convective medium being passed continuously in indirect heat exchange relationship with the reactant streams.

One of the major advantages in the use of combustion gases as a convective fluid is the fact that the temperature of the circulating heating streams may be regulated at a point exterior of the heat exchange or reactor apparatus by commingling freshly generated hot combustion gases with the circulating stream in a portion of the circuit exterior of the heating apparatus. On the other hand, there is a disadvantage encountered in many types of tubular heat exchangers or reactors in that they do not provide uniform heating to each of the individual tubular members that pass through the unit and as a result a uniform conversion of the reactant streams in each of the plurality of tubular members is not obtained.

It is therefore a principal object of the present invention to provide a heating apparatus which effects a substantially uniform heating fluid contact with each of a plurality of tubular members.

It is also an object of the present invention to provide a heating apparatus which has means to uniformly heat a plurality of tubular members or conduits extending through a heating apparatus in a manner whereby the heating medium may pass either concurrently with or countercurrently with respect to the reactant stream passing through each of the tubular members.

It is a still further object of the invention to provide a heating apparatus that is particularly adapted to utilize a gaseous heating medium to effect a uniform temperature control within each of a plurality of tubular members, with the latter being adapted to maintain a catalytic material.

Briefly, the improved heating apparatus of this invention comprises in combination, a cylindrical housing, a plurality of fluid conduits, or tubular members extending longitudinally through the housing, said conduits being placed in a circular arrangement and spaced uniformly around the interior of the housing, fluid inlet and outlet means connecting with each of the conduits, a partitioning member spaced a short distance from each end of the housing and forming thereby a convective fluid distributing section at one end of the housing and a convective fluid collecting section at the end thereof, an open-ended sleeve placed concentrically around each of the plurality of conduits and extending between the partitioning members and the convective fluid distributing and collecting sections, a convective medium inlet connecting centrally with the distributing section at one end of the housing and a convective medium outlet connecting centrally with the collecting section at the opposite end of the housing.

The circular housing and the circular arrangement of the tubular members and their concentrically encompassing sleeves provides an apparatus which is particularly desirable for operations requiring the uniform heating of each of the individual tubular members extending through the heat exchange apparatus. In operation, the convective medium flows through the fluid distributing sections at one end of the housing and distributes itself substantially uniformly through each of the sleeves and thus into a plurality of concentric annular-shaped fluid streams, one for each of the plurality of tubular members, so that as a result each of the latter are heated in a substantially uniform manner. Many of the conventional types of tubular heaters or heat exchange apparatus place a plurality of tubular members or conduits in a relatively compact grouping so that it is difficult to uniformly distribute the heating or convective medium equally and uniformly around each of the tubular members. A compact arrangement of the tubular members also results in another disadvantage, in that the inner tubes tend to have a higher temperature in an exothermic operation than the outer tubes, while conversely, in an endothermic operation the inner tubes tend to operate cooler than the outer tubes of the tube bank. The improved arrangement equalizes the effect of radiant heating between the tubular members.

The present reactor or heat exchange apparatus of this invention is particularly useful for various catalytic conversion operations, either endothermic or exothermic. For example, the catalytic dehydrogenation of butane is advantageously conducted in a reactor of the heat exchange type employing a plurality of relatively small tubes as reaction zones. A solid granular dehydrogenating catalyst is disposed within the tubes and means provided for supplying reactants thereto and removing the resulting conversion products therefrom. The dehydrogenating reaction is of an endothermic nature, therefore, a convective heating fluid such as hot flue gases may be circulated about the tubes to supply heat thereto. During the process operation, a carbonaceous deposit accummulates on the catalyst particles and deactivates the catalyst material, therefore, periodically it is necessary to burn and remove the carbonaceous deposit from the catalyst in order to reactivate the material and permit its continued use for the dehydrogenation of the hydrocarbon stream.

In the reactivation or regeneration of the catalyst, there is a removal of the deleterious carbonaceous material from the catalyst by passing controlled amounts of oxygen containing gases through the catalyst bed maintained within each of the tubes and the deposit is oxidized from the catalyst material. The oxidizing and reactivating operation is an exothermic one which tends to increase the temperature of the catalyst bed. However, in order to prevent the catalyst material from being heated to an excessive temperature which would harmfully deactivate the material, a cooler convective medium may be passed around the tubes to abstract heat liberated by the combustion of the carbonaceous deposits. The temperature of the convective fluid, should of course be carefully controlled for both the conversion and reactivating steps, in order to provide a proper endothermic temperature for the conversion reaction and in order to suitably carry away exothermic heat during the reactivation step, without unduly cooling the catalyst bed. The uniform flow and distribution of the convective fluid to each annular zone or flow channel around each of the tubular reaction zones, provides a processing advantage over many of the prior types of reactors and results in a substantially uniform product stream from each of the plurality of tubular contacting beds.

The improved reactor of this invention is also adaptable for the catalytic reforming of hydrocarbon streams, in an operation utilizing a plurality of tubular contact zones having fixed beds of a reforming catalyst. Catalytic reforming operations generally require high heat inputs to the first portions of the catalyst tubes and a lower heat input at the outlet end of the tubes, for normally the initial contact between the reactant stream and he catalyst bed is highly endothermic and is progressively less so as the stream passes through the remainder of the bed to the outlet end of this contacting zone. The present reactor is particularly ideal for such operations for a high heat input to the first part of the tube may be accomplished by circulating a relatively small quantity of heating medium at a relatively high inlet temperature, and in a flow that is concurrent with the reactant stream through the tubular contacting zone.

It may be pointed out however, that where a more uniform heat input is required to the catalyst bed for a different conversion operation, a larger quantity of gas can be circulated at a lower inlet temperature, while in still another operation, where higher rates of heat input are required toward the outlet end of the contacting tube, the present reactor may be arranged such that the heating medium flows in a direction countercurrent to the reactant stream passing through the catalyst bed in the tubes.

A more specific embodiment of the improved heating apparatus of this invention comprises in combination, an insulated cylindrical housing, a plurality of tubular members extending longitudinally through the housing, the tubular members or elongated conduits being placed in a circular arrangement and spaced uniformly from one another as well as from the wall of the housing around the interior thereof, a fluid inlet header connecting with each of the tubular members at one end thereof and a fluid outlet header connecting with the opposite end of each of the tubular members at the other end of the unit, a partitioning member spaced a short distance from each of the ends of the housing and forming thereby a convective medium distributing section at one end of the housing and a convective medium collecting section at the other end thereof, a cylindrical and insulated inner partitioning wall spaced concentrically within said circular arrangement of tubular members at a distance substantially equal to the distance these tubes are spaced from the wall of the cylindrical housing, the inner insulated partitioning wall forming thereby an annular insulated section around the ring of tubular members, an open-ended sleeve placed concentrically around each of the plurality of tubular members and extending between the partitioning members at the ends of the housing, the open-ended sleeves forming thereby a plurality of annular-shaped channels connecting between the convective medium distributing and collecting sections, a convective medium inlet connecting with the distributing section at one end of the housing and a convective medium outlet connecting with the collecting section at the opposite end of the housing, a continuous insulated duct connecting between the convective medium distributing and collecting sections external of said housing, a convective medium inlet means connecting with the duct, and circulating means connecting with the duct providing a recycling of a major portion of the convective medium from the outlet end of the housing of the inlet end thereof.

An insulating conduit or duct connecting between the convective fluid inlet and outlet of the housing, together with means to introduce a heating fluid and mechanical circulating means, provide a complete unit adaptable to many processing operations. Where hot combustion gases are utilized as the convective heating medium flowing through the reactor section, suitable burners may be attached to the conduit or duct work for circulating the hot combustion gases and thus provide the necessary high temperature gases being circulated to the reactor section. A suitable blower may also be connected with the circulating duct work in order to recycle the gases through the unit while alternately, a suitable pump or like means may be connected with a unit passing a liquid heating or cooling medium through the reactor section as the convective medium.

Reference to the accompanying drawing will serve to clarify the construction features of the improved reactor or heating apparatus, while the following description thereof will point out additional advantages and features of the apparatus.

Figure 1 of the drawing, is an elevational view, partially in section, of the heating apparatus embodying the features of this invention.

Figure 2:
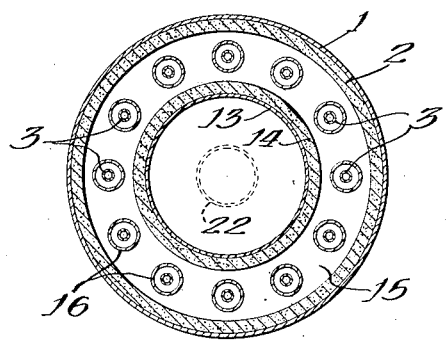

Figure 2 of the drawing is a sectional plan view through the reactor or heat exchange section, as indicated by line 2—2 in Figure 1, showing the arrangement of the tubular elements.

Figure 3:
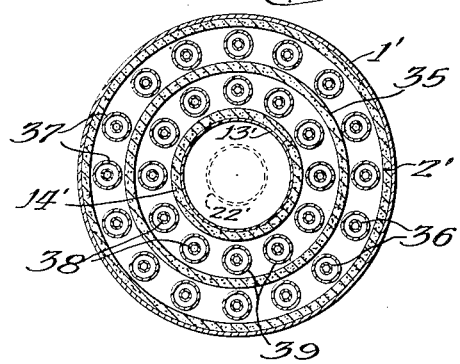

Figure 3 of the drawing is a sectional plan view through an alternate embodiment of the reactor, wherein more than one circular ring of tubular members extends through the cylindrical housing of the reactor.

Referring now to Figures 1 and 2 of the drawing, there is indicated a cylindrical housing 1 having insulating material 2 on the interior thereof. This insulating material may be of any desirable type such as a preformed block type of material of mineral wool, glass fibres, etc., or alternately, a cementitious insulating concrete mix, such as lumnite cement exfoliated vermiculite, or the like, and although not indicated in the drawing, an insulating material may advantageously be used on the exterior of the housing 1. Extending longitudinally through the housing 1 are a plurality of tubular members or conduits 3, which in this embodiment, are indicated as being supported by suitable lugs or bracket members 4 at the upper end thereof so that they may extend longitudinally down through the reactor housing and expand longitudinally thru the lower end of the unit. Although not shown, suitable packing glands may be utilized around each tube at the bottom of the housing to eliminate the loss of convective medium from the housing. Also, the tubes 3 are indicated, in this embodiment, as having flanged ends at both the upper and lower ends so that a powdered or granular catalytic material may be placed in and removed from each of the tubes. Removal plugs or other types of closures may of course be used at either end of the tubes if desired.

A fluid reactant stream is charged to the reactor and to the plurality of tubular conduits 3 by way of inlet line 5 having control valve 6 and a distributing header 7, which in turn has a plurality of connecting lines 8 suitable to distribute the fluid medium uniformly from the header into each of the plurality of tubular conduits 3. In the preferred embodiment of the apparatus such as indicated in the drawing, the distribution header 7 is circular and the connecting lines 8 are of the same length and size so that the material is distributed uniformly to each of the tubular members 3 which in turn are arranged in the reactor housing in a circular manner as shown in Figure 2 of the drawing.

Inside of the housing 1 is an upper tube sheet 9 which extends across the entire diameter of the housing and is spaced a short distance below the upper end of the housing 1. Likewise, at the lower end of the housing 1 is a tube sheet or partition 10 which extends across the inside of the housing a spaced distance from the lower end thereof. The tube sheets 9 and 10 thus provide partitioning members which in turn form an upper convective fluid distributing zone 11 and a lower convective fluid collecting section 12. Extending between the partitioning plates 9 and 10 is a cylindrical partitioning wall 13 which is insulated on the exterior thereof with an insulating layer 14, which preferably is of a similar nature and of a similar thickness to that of the insulating layer 2 on the housing 1. There is thus formed between the inner cylindrical wall 13 and the outer cylindrical housing 1 an annular space 15 which is insulated and through which the plurality of tubular members 3 extend longitudinally.

In a preferred embodiment of the apparatus, the tubular members 3 are spaced in a circular manner around the inside of the housing at a rather short distance from the insulating material 2 and the inner partitioning wall 13 is placed concentrically in the ring of tubes 3 such that it is a relatively short distance from the tubular members in order that a rather narrow annular space 15 is provided between the two walls. In other words, the ring of tubular members 3 is placed concentrically between the two cylindrical and insulated walls of the chamber. Positioned concentrically around each of the tubular members 3 is an open-ended sleeve 16 which extends longitudinally between the partitioning plates 9 and 10 and the respective upper and lower convective fluid distributing zones 11 and 12. This construction thus provides an annular channel around each tubular member 3 between the upper and lower convective medium headers, 11 and 12 respectively. The partitioning plates or tube sheets 9 and 10 are of course open at the points where they connect with each of the open-ended sleeves 16, such that the convective fluid may be channeled around the tubular members from one end of the housing to the other.

As at the upper end of the reactor, a circular header 17 is connected with the lower ends of each of the tubular members 3 by means of suitable connecting lines 18, in order that the heated reactant stream, or alternately cooled stream, may be withdrawn uniformly from each of the tubular sections and discharged to other processing equipment by way of line 19 having control valve 20.

In this reactor, the convective medium which passes in heat exchange relationship with the tubular members, is introduced by means of inlet 21, at the center of the housing 1 and the fluid distributing zone 11, while likewise at the lower end of the unit the convective medium is withdrawn from the center of the convective fluid collecting header 12 and the housing, by means of outlet 22.

With the convective fluid inlet 21 positioned symmetrically with respect to the plurality of tubular members 3 and the use of the restricted flow channels as provided by the plurality of open-ended sleeve 16, there is insured a substantially uniform flow of the convective heating medium through the housing and substantially uniform heating of each of the individual tubular members 3. The circular arrangement of the tubes and the open-ended sleeves although substantially eliminating any heating of the individual tubes by radiant heating from one tube to another, equalizes such radiant heating effect and insures that each individual tubular conduit is primarily heated by means of the convective fluid passing in the confined annular spaces 15 within each of the plurality of sleeves 16. Thus, the uniform distribution of the convective fluid, whether a heating or cooling medium, and the uniform distribution and collection of the reactant streams by means of the circular headers at the top and bottom of the housing, there is insured a substantially uniform processing of the reactant stream within each individual tubular member.

In this embodiment, the hot convective medium being passed around the tubular members 3 is indicated as being a hot combustion gas stream supplied by means of one or more burners 23 in a combustion chamber which connects with duct 24, that in turn connects with and discharges into the inlet 21 at the top of the housing 1. The present embodiment also provides means to recirculate a major portion of the hot combustion gases in order that they not be wasted and may be utilized in a continuously circulating stream. The hot gaseous stream after passing downwardly through the reactor chamber and each of the sleeves 16 is withdrawn from the lower header collecting section 12 and passes through the outlet 22 into the duct 25, which in turn connects with a blower 26, or other means suitable to maintain a circulation of a gaseous medium. Blower 26 in turn discharges into a duct 27, that communicates with the heat supplying burners 23 and inlet duct 24. Connecting with the duct 27 is an outlet conduit 28 having a damper 29 therein, suitable to permit the venting or discharge of a minor portion of the flue gases, as may be necessary. Control of the burner 23 and of the quantity and temperature of the hot combustion gases may be maintained through the fuel supplied through line 30, having control valve 31, and the air supply by way of line 32 having control valve 33.

In a preferred operation of the reactor and of the entire heat exchange unit, suitable controls may be utilized to effect a continuous and automatic operation of the burner 23 and of the blower 26 in order that a suitable temperature convetive stream is passed around the individual tubular members 3 in which a particular conversion is being carried out. For example, let it be assumed that an endothermic catalytic conversion operation, such as the catalytic reforming of low grade gasoline or naphtha stream is being effected in the unit, and a hot combustion gas stream is being circulated downwardly through the heat exchange passageways of the reactor, concurrently with the flow of the reactant stream in each of the tubular members 3. The conversion operation being endothermic, a heat supplying combustion gas stream is passed to and distributed from the header section 11 at a temperature regulated by the hot combustion gases being supplied from burner 23, which in turn is adjusted in response to the temperature requirement at the upper end of each of the tubular conversion conduits 3. While, in addition the quantity of hot flue gases being circulated may be controlled by the heat requirements along the lower portion of each of the tubular members 15 as indicated by suitable temperature indicating means connecting therewith, and operative on the blower 26 in order to control the quantity of convective fluid passing through the reactor unit. In a catalytic reforming operation, normally a large amount of heat is required at the inlet end of the reactor tubes while a lesser amount is needed in the lower portion thereof and as a result the convective medium would be passed at a relatively high temperature through the system but in a rather small volume of quantity so that the temperature of the convective stream would be dissipated to the tubular members as it passes downwardly through the annular flow channel as provided by each of the open-ended sleeves 16. However, as previously noted hereinabove, if a more uniform heat input is required for an operation of a different nature, a larger quantity of the convective medium may be circulated through the reactor in heat exchange relationship with the tubes to provide a more uniform heating throughout the entire length of the tubular member.

It is also within the scope of the present apparatus to have the flows of the reactant streams, or alternately of the convective medium, reversed such that either the reactant stream is entering the lower header 17 to pass upwardly countercurrently to the convective medium, or to change the positioning of the blower 26 so that the hot convective medium enters the lower end of the reactor housing, to pass upwardly countercurrently to a reactant stream being introduced at the top of the unit through the header 7.

Although the embodiment of the improved reactor or heat exchange apparatus as indicated in Figures 1 and 2 of the drawing is substantially diagrammatic, certain desirable construction features may be utilized in a preferred embodiment of the reactor. For example, each of the horizontal partitioning members 9 and 10 may be provided with suitable concentric corrugations or offsets, such as between the inner cylindrical partitioning wall 13 and the circular row of sleeves 16, as well as at their outer peripheries where they join with the housing 1. Suitable corrugations of this type permit expansion of the sleeves 16, longitudinally with respect to the inner partitioning walls 13 and the outer wall of the housing 1 and prevent injurious displacement or buckling of each of the partitioning plates 9 and 10. Also, in a preferred embodiment of the heating apparatus, suitable insulation is placed within each of the convection fluid headers 11 and 12 at each end of the housing 1, as well as within the convective fluid ducts 24, 25 and 27, in order to prevent injury from the hot gases or other fluid medium which passes through the duct work.

Referring now to Figure 3 of the drawing, there is shown an alternate embodiment of the reactor or heating apparatus which maintains more than one ring or circular row of tubular members passing through the housing. In this alternate embodiment there is an outer cylindrical housing 1' having an inner layer of insulating material 2', an intermediate partitioning wall 35 and an inner cylindrical partitioning wall 13' having insulation 14' attached thereto. Spaced uniformly and equidistantly in a circular arrangement are a plurality of tubular conduits 36. As in Figure 1 of the drawing, an open-ended sleeve 37 is placed concentrically around each of the tubular members 36 so that there is thus formed a plurality of annular fluid channels around each tubular member that is suitable to transfer a convective heating or cooling medium from one end of the housing 1 to the other end, in the aforedescribed manner for Figure 1 of the drawing. A second row of tubular members 38 is arranged circularly between the intermediate partitioning wall 35 and the inner partitioning member 13', and around each of the plurality of tubular members 38 is an open-ended sleeve 39, which as in the manner of the other tubular members provides an open annular-shaped fluid channel around each of the individual tubes 38.

In the embodiment of Figure 3, the convective medium is charged into the distributing header at the end of the housing at the center thereof, so that the fluid medium is distributed substantially uniformly laterally and radially outward to each of the open-ended sleeves which connect with the header section. The symmetrical arrangement of the apparatus and the concentric circular arrangement of each of the rows of the tubular members and their encompassing open-ended sleeves, insures a substantially uniform flow of the convective medium to each of the individual tubular members and an efficient uniform conversion may be accomplished in each of the individual members of the long tubular chambers 36 and 38. With suitably proportioned open-ended sleeves 37 and 39, or alternately by the use of suitably arranged partitioning or baffling members within the convective fluid distribution header at the end of the housing, the flow of the convective heating medium can be substantially equalized as to quantity and temperature flowing downwardly around each of the tubular conduits.

It is not intended to limit this improved heat exchange apparatus or reactor to the utilization of any particular number of tubular members in each of the concentric rows nor to any particular number of rows within the housing, for in a large diameter unit a multiplicity of concentric tubes and open-ended sleeves surrounding them may be economically and desirably placed longitudinally through the housing. Also, it is not intended to limit the use of the heating apparatus to any particular conversion operation, for as noted hereinabove the apparatus is particularly adaptable to catalytic operations wherein the catalyst material is placed within each of the plurality of tubular members. However, the improved apparatus may be used advantageously as a heat exchange apparatus accommodating fluid streams being heated or cooled in a noncatalytic operation.

I claim as my invention:

A heat exchange apparatus comprising a cylindrical housing having end closures, partitioning members within and extending across the end portions of said housing and spaced from said closures to form a header section at each end of the housing, a convective fluid inlet connected centrally with one of said header sections, a convective fluid outlet connected centrally with the other of said header sections, a plurality of elongated fluid conduits extending through said end closures and header sections and positioned in a circular arrangement around the interior of the housing, fluid inlet and outlet means for said conduits, and an open-ended sleeve disposed concentrically around and spaced from each of said fluid conduits and extending between said partitioning members to provide communication between said header sections.

HAROLD A. BECKER.

REFERENCES CITED

The following references are of record in the file of this patent:

UNITED STATES PATENTS

| Number | Name | Date |
| --- | --- | --- |
| 13,619 | Moore | Oct. 2, 1855 |
| 91,173 | Sintzenich | June 8, 1869 |
| 338,861 | Morris | Mar. 30, 1886 |
| 691,044 | Burger et al. | Jan. 14, 1902 |
| 715,842 | McKay | Dec. 16, 1902 |
| 1,113,226 | Lovekin | Oct. 13, 1914 |
| 1,942,257 | Rudder | Jan. 2, 1934 |
| 1,948,541 | Noack | Feb. 27, 1934 |
| 2,030,265 | Nygaard | Feb. 11, 1936 |
| 2,038,807 | Synnott | Apr. 28, 1936 |
| 2,110,209 | Engels | Mar. 8, 1938 |
| 2,216,809 | Derby | Oct. 8, 1940 |
| 2,312,217 | King et al. | Feb. 23, 1943 |
| 2,336,879 | Mekler | Dec. 14, 1943 |
| 2,382,255 | Pyzel | Aug. 14, 1945 |
| 2,389,448 | Mekler | Nov. 20, 1945 |
| 2,429,916 | Belgau | Oct. 28, 1947 |
| 2,478,779 | Pieper | Aug. 9, 1949 |
| 2,500,499 | Schuurman | Mar. 14, 1950 |